(12) United States Patent
Oh et al.

(10) Patent No.: US 7,976,810 B2
(45) Date of Patent: Jul. 12, 2011

(54) METHOD FOR PREPARING CERIUM CARBONATE POWDER

(75) Inventors: Myoung-Hwan Oh, Daejeon (KR);
Seung-Beom Cho, Daejeon (KR);
Jun-Seok Nho, Daejeon (KR); Jong-Pil Kim, Daejeon (KR); Jang-Yul Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/531,450

(22) PCT Filed: Mar. 14, 2008

(86) PCT No.: PCT/KR2008/001467
§ 371 (c)(1),
(2), (4) Date: Feb. 18, 2010

(87) PCT Pub. No.: WO2008/114972
PCT Pub. Date: Sep. 25, 2008

(65) Prior Publication Data
US 2010/0143233 A1    Jun. 10, 2010

(30) Foreign Application Priority Data

Mar. 16, 2007  (KR) .................. 10-2007-0025880

(51) Int. Cl.
*C01B 31/24* (2006.01)
(52) U.S. Cl. .................. 423/263; 423/419.1; 51/309
(58) Field of Classification Search ............. 51/309; 423/263, 419.1
See application file for complete search history.

(56) References Cited

U.S. PATENT DOCUMENTS

| 5,879,715 A * | 3/1999 | Higgins et al. ............. 424/489 |
| 2008/0132403 A1* | 6/2008 | Nho et al. .................. 501/152 |

FOREIGN PATENT DOCUMENTS

| JP | 07-144915 A | 6/1995 |
| JP | 07-172826 A | 7/1995 |
| JP | 2000-159521 A | 6/2000 |
| KR | 10-2000-0069823 A | 11/2000 |
| KR | 10-2003-0093193 A | 12/2003 |

* cited by examiner

*Primary Examiner* — Stuart Hendrickson
*Assistant Examiner* — Richard M Rump
(74) *Attorney, Agent, or Firm* — Rothwell, Figg, Ernst & Manbeck, P.C.

(57) ABSTRACT

In a method for preparing cerium carbonate powder by mixing a cerium precursor solution with a carbonate precursor solution and carrying out a precipitation reaction, wherein cerium carbonate is controlled to have an orthorhombic crystal structure, a hexagonal crystal structure or an orthorhombic/hexagonal mixed crystal structure, by using at least one type of organic solvent comprising at least two hydroxyl groups (OH) in molecular formula as a solvent for either or both the cerium precursor solution and the carbonate precursor solution, and varying a number of carbons or hydroxyl groups (OH) included in the molecular formula of the organic solvent. The method can easily and inexpensively obtain cerium carbonate powder with a desired crystal structure without the danger by high-temperature high-pressure and the need for an expensive system in hydrothermal synthesis.

12 Claims, 1 Drawing Sheet

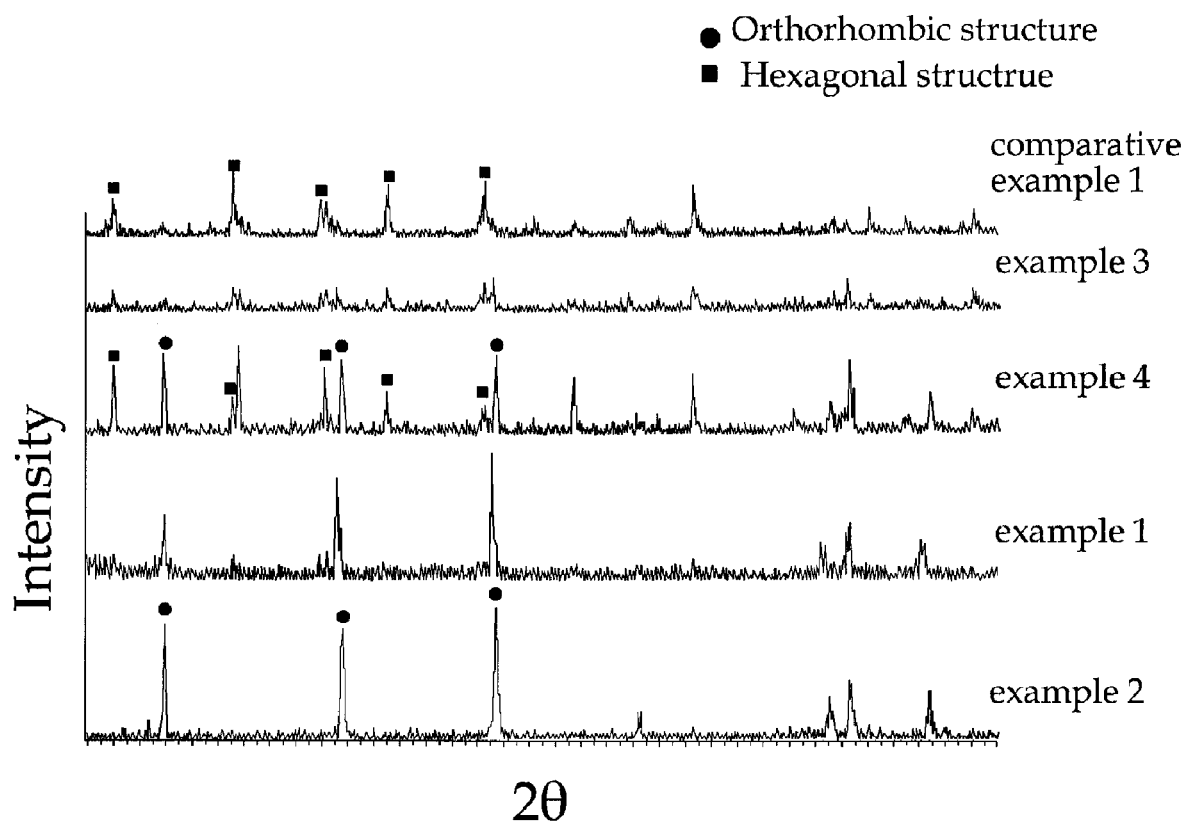

METHOD FOR PREPARING CERIUM CARBONATE POWDER

CROSS REFERENCE TO RELATED APPLICATIONS

This application is a 35 U.S.C. §371 National Phase Entry Application from PCT/KR2008/001467, filed Mar. 14, 2008, and designating the United States, which claims priority under 35 U.S.C. §119 to Korean Patent Application No. 10-2007-0025880 filed Mar. 16, 2007, which is incorporated herein in its entirety.

TECHNICAL FIELD

The present invention relates to a method for preparing cerium carbonate powder under atmospheric pressure by a precipitation method, which can easily control the crystal structure of the resultant cerium carbonate only by varying the type of solvent used in the preparation of the cerium carbonate.

BACKGROUND ART

As generally known in the art, cerium oxide ($CeO_2$) is a highly functional ceramic material that is widely used in catalysts, phosphors, cosmetics and polishing agents, and has recently been spotlighted as an abrasive for use in an STI (Shallow Trench Isolation) process of a semiconductor device, and as an optical glass polishing agent. Such cerium oxide is generally prepared by a liquid-phase process, in which cerium oxide powder is formed directly from a trivalent or tetravalent cerium precursor by adding a precipitant thereto, a solid-phase process, in which cerium oxide powder is formed by providing an intermediate product, such as cerium carbonate, and then performing a firing step, and the like.

Particularly, in the solid-phase process, cerium carbonate is widely used as an intermediate product of cerium oxide, and research on the types and shapes of cerium carbonate is being actively pursued because they have a great effect on the physical properties and shapes of cerium oxide.

Several examples of conventional technology for synthesizing cerium carbonate powder in a solution phase include 1) a method of preparing orthorhombic cerium carbonate powder by subjecting a cerium salt and urea to a precipitation reaction, 2) a method of preparing hexagonal cerium carbonate powder by subjecting a cerium salt and urea to a hydrothermal reaction, and 3) an attempt to adjust powder crystallinity depending on the type of a salt, reaction temperature, reaction time, and concentration of urea when cerium carbonate powder is prepared by subjecting cerium chloride, cerium sulfide, or cerium nitrate anhydrate and urea to a hydrothermal reaction, and so forth. However, no study has been conducted on adjusting powder crystallinity at relatively low precipitation temperature under atmospheric pressure.

The crystal structure of cerium carbonate varies according to preparation methods, and particularly may be divided into an orthorhombic structure, a hexagonal structure, and the like. As far as is known, the orthorhombic cerium carbonate can be prepared by an aqueous solution-based precipitation reaction, and the hexagonal cerium carbonate can be prepared by high-temperature high-pressure hydrothermal synthesis. However, as processes are scaled up, high pressure employed in the hydrothermal synthesis becomes more dangerous, which results in high equipment cost.

DISCLOSURE OF THE INVENTION

Therefore, the present invention has been made in view of the above-mentioned problems. The present inventors have discovered that in preparing cerium carbonate under atmospheric pressure by a precipitation reaction, it is possible to control the physical properties of cerium carbonate powder by using at least one type of organic solvent as a solvent, and to change the crystal structure of cerium carbonate powder, and thus obtain cerium carbonate powder with an orthorhombic and/or a hexagonal crystal structure by varying the number of carbons or hydroxy groups (OH) included in the molecular formula of such an organic solvent. Accordingly, cerium carbonate powder with an orthorhombic and/or a hexagonal crystal structure can be prepared only by varying the type of solvent, even without using hydrothermal synthesis that is dangerous due to high temperature and high pressure.

In accordance with an aspect of the present invention, there is provided a method for preparing cerium carbonate powder by mixing a cerium precursor solution with a carbonate precursor solution and carrying out a precipitation reaction, wherein cerium carbonate is controlled to have an orthorhombic crystal structure, a hexagonal crystal structure or an orthorhombic/hexagonal mixed crystal structure, by using at least one type of organic solvent comprising at least two hydroxyl groups (OH) in molecular formula as a solvent for either or both the cerium precursor solution and the carbonate precursor solution, and varying a number of carbons or hydroxyl groups (OH) included in the molecular formula of the organic solvent.

In accordance with another aspect of the present invention, there is provided cerium carbonate powder prepared by the above described method.

In accordance with yet another aspect of the present invention, there is provided cerium oxide powder, which is prepared by heat-treating the cerium carbonate powder at 300° C. to 1500° C.

In accordance with a further aspect of the present invention, there is provided CMP slurry including the cerium oxide powder as an abrasive.

Hereinafter, the present invention will be described in more detail.

A production reaction of cerium carbonate by a precipitation reaction from a cerium precursor and a carbonate precursor is explained as follows. Reaction Scheme 1 and the Reaction Scheme 2 indicate a production reaction of orthorhombic cerium carbonate, and a production reaction of hexagonal cerium carbonate, respectively.

$$2[Ce_2(H_2O)_n]^{3+} + 3CO_3^{2-} \rightarrow Ce_2O(CO_3)_2 \cdot H_2O + CO_2 + (n-1)H_2O \quad \text{[Reaction Scheme 1]}$$

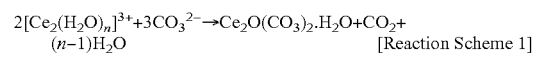

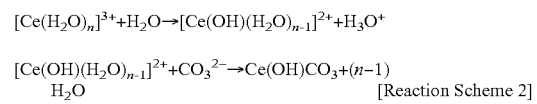

[Reaction Scheme 2]

It is known that orthorhombic cerium carbonate is easily prepared by a conventional aqueous solution-based precipitation reaction, but hexagonal cerium carbonate has been difficult to prepare by an aqueous solution.

For example, in production of hexagonal cerium carbonate in Reaction Scheme 2, before $CO_3^{2-}$ is bound to a Ce ion, weak hydrolysis of the Ce ion is required. Such a reaction can be carried out at a high reaction temperature. Accordingly, in a conventional method of preparing hexagonal cerium carbonate, high-temperature high-pressure hydrothermal synthesis has been used. However, as processes are scaled up, high pressure employed in the hydrothermal synthesis becomes more dangerous, which results in high equipment cost. The present invention provides a method of controlling the crystal structure of cerium carbonate powder under atmospheric pressure by a precipitation reaction without using hydrothermal synthesis.

In the present invention, when cerium carbonate powder is prepared under atmospheric pressure by a precipitation reaction from a cerium precursor and a carbonate precursor, at least one type of organic solvent, including at least two hydroxy groups (OH) in its molecular formula, is used, while in a conventional method, only water is used as a solvent. Herein, it is possible to prepare cerium carbonate powder with an orthorhombic and/or a hexagonal crystal structure through control of the crystal structure of the resultant cerium carbonate by varying the number of carbons or hydroxy groups (OH) included in the molecular formula of such an organic solvent.

Especially, when a solvent including at least two hydroxy groups (OH) is used, a cerium precursor and a carbonate precursor in salt forms can be easily dissolved, compared to a conventional organic solvent. Also, when such a solvent is mixed with water, the solvent is not separated because even a large amount of solvent is well mixed with water.

When the number of carbons included in the molecular formula of an organic solvent, or the number of H or OH groups attached to the carbons, is varied, it is possible to control the speed of hydrolysis in the above described precipitation reaction, and thereby to control the crystal structure of cerium carbonate powder.

According to the results of experiments, it has been found that as the number of carbons in the molecular formula of an organic solvent is increased, the crystal structure of cerium carbonate is converted from an orthorhombic structure to a hexagonal structure. For example, in the case of dihydric alcohol, when $C_2$ ethylene glycol is included in a solvent, it is possible to obtain cerium carbonate with an orthorhombic structure, an orthorhombic/hexagonal mixed structure, or a hexagonal structure, according to conditions such as reaction temperature, and when propanediol or butanediol with a carbon number of 3 or more is included in a solvent, it is possible to obtain cerium carbonate of a hexagonal structure.

An organic solvent that may be used in the present invention may include a backbone of hydro carbon, and a functional group directly attached to the backbone, and herein, the functional group include 2~10 hydroxy groups (OH) regardless of positions. Non-limiting examples of such an organic solvent preferably includes glycol based materials.

Specifically, examples of an organic solvent that may be used in the present invention preferably include:

1) glycol based: ethylene glycol, propylene glycol, butylene glycol, etc.

2) others: glycerol, etc.

The organic solvent may include one or at least two kinds of solvents selected from the examples. Also, a cerium precursor solution and a carbonate precursor solution may use the same or different organic solvents.

From among the above enumerated organic solvents, in the present invention, an organic solvent including 3 to 10 carbons in the molecular formula and at least two hydroxy groups (OH) attached to the carbons may be used. Accordingly, cerium carbonate with a hexagonal crystal structure may be obtained. Specifically, the examples of such an organic solvent include propanediol, butanediol, etc.

In the present invention, an organic solvent including 2 carbons in the molecular formula may be used, and thus it is possible to obtain cerium carbonate with an orthorhombic crystal structure, a orthorhombic/hexagonal mixed crystal structure, or a hexagonal crystal structure according to reaction conditions, especially a reaction temperature of 70 to 130° C. Specifically, the examples of such an organic solvent include ethylene glycol, etc. In the range of the reaction temperature, at lower temperatures, the proportion of the orthorhombic structure is increased, and on the other hand, at higher temperatures, the proportion of the hexagonal structure is increased.

The cerium precursor is not particularly limited as long as it is a cerium containing compound, but preferably has a salt form. Non-limiting examples of such a cerium precursor include cerium nitrate, cerium acetate, etc.

The carbonate precursor provides a carbonate ion ($CO_3^{2-}$), and plays a role of controlling pH, and non-limiting examples of the carbonate precursor include carbonate, carbonated water, oxalate, etc. In the present invention, ammonium carbonate is especially preferred. Ammonium carbonate is dissociated into $NH^{4+}$ and $CO_3^{2-}$ ions in a solution. Herein, $NH^{4+}$ plays a role of precipitant that changes the pH value of the entire solution and thus leads the precipitation reaction, and $CO_3^{2-}$ forms cerium carbonate by binding with $Ce^{3+}$.

In preparing precursor solutions by dissolving the cerium precursor and the carbonate precursor in solvents, respectively, the solvents preferably include at least one type of organic solvent. In other words, a cerium precursor solution and a carbonate precursor solution may use water, an organic solvent, or a mixture thereof as a solvent, respectively, and at least one of the cerium precursor solution and the carbonate precursor solution must include an organic solvent. Therefore, except the case where both the cerium precursor solution and the carbonate precursor solution use only water as solvents, all cases may be included within the present invention.

Herein, in consideration of the solubility of the cerium precursor and the carbonate precursor in an organic solvent, it is preferable that the cerium precursor and a solvent are mixed at a weight ratio of 1:100~1:1, and the carbonate precursor and a solvent are mixed at a weight ratio of 1:100~1:1. When the concentration of the cerium precursor and the carbonate precursor is decreased, the solubility in a solution is increased, which results in a uniform and mild precipitation reaction, and thus it is possible to prepare powder having a uniform particle size. However, if the concentration is lower than the above concentration range, the yield of the powder may decrease, thereby decreasing the applicability to an actual process. Contrarily, if the concentration is higher than the above concentration range, some problems may be caused in the reaction, such as delay in dissolution time, violent reaction, and boiling, etc.,.

Cerium carbonate powder may be precipitated through a precipitation reaction by mixing the cerium precursor solution and the carbonate precursor solution as described above.

Herein, it is preferable that the cerium precursor solution and the carbonate precursor solution are mixed in such a manner that a mixing ratio of the cerium precursor to the carbonate precursor is 1M: 0.1M~20M in the mixed solution. If the concentration of the carbonate precursor is lower than the above described range, the yield of finally obtained cerium carbonate powder may decrease, and contrarily, if the concentration of the carbonate precursor is higher than the above described range, boiling may occur during a reaction of the two solutions, thereby causing difficulty in the reaction.

The reaction temperature during the precipitation reaction preferably ranges from 70 to 150° C. Especially, in order to obtain cerium carbonate powder with an orthorhombic and/or a hexagonal crystal structure, it is more preferable that the reaction temperature ranges from 70 to 130° C. If the reaction temperature is lower than 70° C., large cerium carbonate powder with an amorphous or Lanthanite-Ce ($Ce_2(CO_3)_3 \cdot 8H_2O$) plate shape is obtained. Contrarily, if the reaction temperature is higher than 150° C., dissolution of crystals occurs, and thus it is difficult to obtain crystalline powder.

Also, the increase in a precipitation reaction time facilitates the entire reaction, which has an effect on the crystallinity of finally obtained cerium carbonate powder. Therefore, the reaction time during the precipitation reaction preferably ranges from 30 minutes to 60 hours.

Preferably, the cerium carbonate powder prepared in this way is subjected to centrifugal separation and washing, and then is dried at about 90° C. for 24 hours.

Meanwhile, since the cerium carbonate powder of the present invention is prepared through the inventive method characterized by using an organic solvent, the organic solvent may remain on the surface or inside of the cerium carbonate powder, even after the centrifugal separation, washing and drying steps. The residual organic solvent may be analyzed by measuring carbon residue with TOC (Total Organic Carbon), or the like. Also, in a certain analysis method in which carbon residue may be detected together with carbonate ($-CO_3$) forming cerium carbonate, it is preferable that, except the carbonate ($-CO_3$), only carbon residue is analyzed. For example, the cerium carbonate powder of the present invention may contain carbon (except the carbonate ($-CO_3$)) remaining in an amount of 0.1 ppm to 100 ppm. Carbon residue analyzed in an amount of less than the above range may be caused by analytical errors, or may be detected in the case of using water alone as a solvent.

Cerium oxide powder according to the present invention may be prepared from cerium carbonate powder by powder preparation method using a firing-step generally known in the art. Such a powder preparation method may preferably include a firing step, in which cerium carbonate powder according to the present invention is heat-treated at 300° C. to 1500° C.

When cerium oxide is used as an abrasive for CMP slurry, the crystal structure of cerium carbonate, (that is, an intermediate product for cerium oxide) has a significant influence on a size and a shape of cerium oxide powder, as well as a polishing property of the cerium oxide powder as an abrasive.

CMP slurry including the cerium oxide powder as an abrasive may be prepared by dispersing the cerium oxide powder and a dispersant into a solvent.

The dispersant applicable in the present invention includes a non-ionic polymer dispersant or an anionic polymer dispersant. The non-ionic polymer dispersant includes at least one kind selected from the group including polyvinyl alcohol (PVA), ethylene glycol (EG), glycerin, polyethylene glycol (PEG), polypropylene glycol (PPG), and polyvinyl pyrrolidone (PVP). The anionic polymer dispersant includes at least one kind selected from the group including polyacrylic acid, ammonium polyacrylate, and polyacryl maleic acid. However, the above examples of dispersant are illustrative only, and the scope of the present invention is not limited thereto.

The dispersant is preferably contained in an amount of 0.001 to 10 parts by weight, based on 100 parts by weight of cerium oxide as an abrasive. More preferably, the dispersant is contained in an amount of 0.02 to 3.0 parts by weight, based on 100 parts by weight of cerium oxide. If the content of the dispersant is less than 0.001 parts by weight, rapid precipitation is caused by low dispersibility, so that the abrasive cannot be uniformly supplied because precipitation occurs in the middle of the transport of the polishing slurry. Contrarily, if the dispersant is contained in an amount greater than 10 parts by weight, a thick dispersant polymer layer functioning like a cushioning layer may be formed in the vicinity of the abrasive particles, which makes it difficult to allow the surface of the abrasive particles to come in contact with a silica surface for polishing, resulting in a drop in polishing rate.

Preferably, the CMP slurry is obtained by mixing cerium oxide powder with a dispersant in water and then titrating the resultant solution to pH 6 to 8. For the pH titration, 1N KOH, 1N $HNO_3$, etc. may be used.

Upon the completion of the pH titration, the CMP slurry is preferably subjected to a dispersion stabilization step in order to improve its dispersion and storage stability. The dispersion stabilization step may be performed using a dispersion system generally known in the art. For example, an APEX mill (Kotobuki eng. & mfg. Co., Japan) may be used. When the dispersion stabilization step is performed using the APEX mill, zirconia beads with a size of 0.01 to 1 mm are used, cerium oxide slurry is introduced into the APEX mill at a feed rate of 10 to 1000 ml/min by using a pump, and a mixture of the zirconia beads and the cerium oxide slurry is repeatedly agitated in the mill at a rate of 2000 to 5000 rpm over 1 to 20 passes.

BRIEF DESCRIPTION OF THE DRAWINGS

FIG. 1 is a graph illustrating results of XRD (X-Ray Diffraction) analysis of cerium carbonate powders prepared in Examples 1~4 and Comparative Example 1.

BEST MODE FOR CARRYING OUT THE INVENTION

Reference will now be made in detail to the preferred embodiments of the present invention. It is to be understood that the following examples are illustrative only, and the scope of the present invention is not limited thereto.

Example 1

A first solution was prepared in a vessel by dissolving 0.1 mol of cerium nitrate in 50 mL of distilled water at room temperature, and mixing 50 ml of ethylene glycol with the dissolved cerium nitrate. Also, a second solution was prepared in another vessel by dissolving 0.1 mol of ammonium carbonate in 50 mL of distilled water at room temperature and mixing 50 ml of ethylene glycol with the dissolved ammonium carbonate. Then, the two solutions were mixed and were subject to precipitation reactions at 90° C. for 24 hours. XRD analysis confirmed that the resultant powder is cerium carbonate powder with a hexagonal structure as shown in FIG. 1.

Example 2

Cerium carbonate powder was obtained in the same manner as described in Example 1, except that butanediol was used, instead of ethylene glycol.

XRD analysis confirmed that the resultant powder is cerium carbonate powder with a hexagonal structure as shown in FIG. 1.

Example 3

Cerium carbonate powder was obtained in the same manner as described in Example 1, except the reaction temperature was 70° C., instead of 90° C.

XRD analysis confirmed that the resultant powder is cerium carbonate powder with an orthorhombic structure as shown in FIG. 1.

Example 4

Cerium carbonate powder was obtained in the same manner as described in Example 1, except the reaction temperature was 80° C., instead of 90° C.

XRD analysis confirmed that the resultant powder is cerium carbonate powder with an orthorhombic/hexagonal mixed structure as shown in FIG. 1.

Comparative Example 1

Cerium carbonate powder was obtained in the same manner as described in Example 1, except that an organic solvent was not used, and only distilled water was used as a solvent.

XRD analysis confirmed that the resultant powder is cerium carbonate powder having an orthorhombic structure as shown in FIG. 1.

INDUSTRIAL APPLICABILITY

As can be seen from the foregoing, in preparing cerium carbonate under atmospheric pressure by a precipitation reaction, the present invention makes it possible to easily control the crystal structure of cerium carbonate powder by using at least one type of organic solvent as a solvent and varying the number of carbons or hydroxy groups (OH) included in such an organic solvent. Accordingly, it is possible to easily and inexpensively obtain cerium carbonate powder with a desired crystal structure without the danger by high-temperature high-pressure and the need for an expensive system in hydrothermal synthesis. Also, the physical properties of cerium oxide prepared from the cerium carbonate can be easily controlled, thereby improving the performance of an abrasive for CMP slurry.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

The invention claimed is:

1. A method for preparing cerium carbonate powder comprising:
   (a) mixing a cerium precursor solution with a carbonate precursor solution; and
   (b) carrying out a precipitation reaction,
   wherein at least one of the cerium precursor solution and the carbonate precursor solution comprises at least one organic solvent having (i) at least two carbons atoms and (ii) at least two hydroxyl groups in its molecular formula; and
   wherein the number of carbon atoms and hydroxyl groups in the organic solvent is each selected to produce cerium carbonate having at least one crystal structure from the group consisting of an orthorhombic crystal structure and a hexagonal crystal structure.

2. The method according to claim 1, wherein the organic solvent contains 3 to 10 carbons in its molecular formula to produce the cerium carbonate powder having a hexagonal crystal structure.

3. The method according to claim 1, wherein the organic solvent contains two carbon atoms in its molecular formula,
   wherein the precipitation reaction is performed at a temperature in a range of 70 to 130° C.

4. The method according to claim 1, wherein the organic solvent comprises a backbone of hydro carbon, and a functional group directly attached to the backbone, and wherein the functional group comprises 2-10 hydroxy groups.

5. The method according to claim 1, wherein a cerium precursor of the cerium precursor solution comprises cerium nitrate or cerium acetate.

6. The method according to claim 1, wherein a carbonate precursor of the carbonate precursor solution comprises ammonium carbonate.

7. The method according to claim 1, wherein the cerium precursor solution comprises a cerium precursor and a solvent in a weight ratio of 1:100 to 1:1, and
   wherein the carbonate precursor solution comprises a carbonate precursor and a solvent in a weight ratio of 1:100 to 1:1.

8. The method according to claim 1, wherein a mixing molar ratio of a cerium precursor to a carbonate precursor in step (a) is in a range of 1:0.1 to 1:20.

9. The method according to claim 1, wherein the precipitation reaction is performed at a temperature in a range of 70° C. to 150° C. for 30 minutes to 60 hours.

10. The method according to claim 1, wherein the precipitation reaction is performed under atmospheric pressure.

11. The method according to claim 1, wherein the organic solvent comprises a glycol based solvent.

12. The method according to claim 1, wherein the organic solvent comprises at least one material selected from the group consisting of ethylene glycol, propylene glycol, butylene glycol and glycerol.

* * * * *